June 5, 1951 G. HEPP 2,556,083

MAGNETIC AMPLIFIER

Filed July 8, 1946

INVENTOR
GERARD HEPP
BY [signature]
ATTORNEY.

Patented June 5, 1951 2,556,083

UNITED STATES PATENT OFFICE 2,556,083

MAGNETIC AMPLIFIER

Gerard Hepp, Eindhoven, Netherlands, assignor to Hartford National Bank and Trust Company, Hartford, Conn., as trustee Application July 8, 1946, Serial No. 681,856
In the Netherlands August 14, 1943

Section 1, Public Law 690, August 8, 1946
Patent expires August 14, 1963

2 Claims. (Cl. 179—171)

It is common to amplify a signal by acting by means thereof upon the magnetisation of the ferro-magnetic core of an inductance coil, the amplitude of an auxiliary oscillation appearing in the circuit of the inductance being controlled by the produced inductance variations, from which auxiliary oscillation the amplified signal is taken by rectification. Such a device may be called a magnetic amplifier.

Magnetic amplifiers have the advantage that no amplifying tubes are necessary. In contradistinction thereto they are suffering from the drawback that sometimes the obtained amplification is insufficient. It has been sought to raise the amplification by making use of a backcoupling, but in this case difficulties were experienced, since in conjunction with hysteresis phenomena the amplification greatly depends on the prehistory of the core material. This is why the backcoupling cannot be raised to such a degree as to attain a maximum amplification increase, since in this case there is a risk of self-oscillation.

The present invention has for its object to provide a magnetic amplifier which does not exhibit the aforesaid drawbacks.

According to the invention an oscillation modulated by the signal to be amplified produces an alternating field having a variable amplitude in the ferromagnetic core of an inductance coil, as a result of which the amplitude, the phase or the frequency of an auxiliary oscillation appearing in the circuit of the inductance is acted upon, from which auxiliary oscillation the amplified signal is taken, more particularly by detection.

Preferably, at least a part of the amplified signal is joined to the signal to be amplified in such a manner as to obtain a regenerative backcoupling. The frequency of the oscillation, to which the signal to be amplified is modulated, is preferably given a high value relatively to the frequency of the auxiliary oscillation.

The invention is particularly suitable for use in carrier wave telephony systems, since in this case the incoming signal has already been modulated, so that it can be directly supplied to an amplifier according to the invention. For the obtainment of backcoupling the amplified signal must then be modulated before it can be joined to the incoming signal, it is true, but this does not constitute a grave drawback, since the modulators and carrier-wave generators required therefore are yet available in a carrier-wave telephony system.

The invention has the great advantage that no trouble is experienced from hysteresis phenomena, which permits the use of a backcoupling having such a strength that the circuit can be brought on the verge of self-oscillation.

In order that the invention may be clearly understood and readily carried into effect it will now be described more fully with reference to the accompanying drawing, given by way of example, which represents two embodiments thereof.

Figure 1:
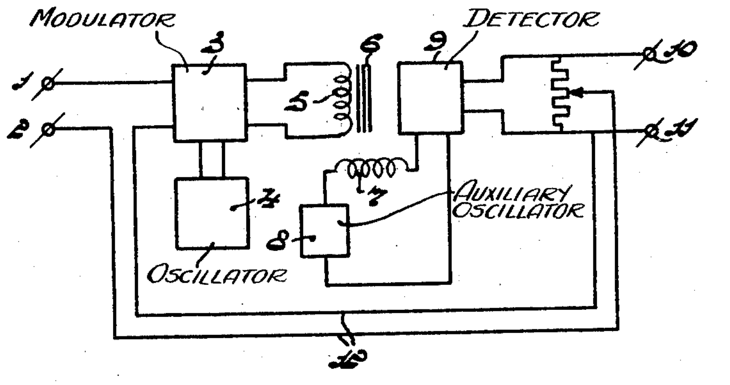

In the circuit shown in Fig. 1 a signal to be amplified is supplied through terminals 1 and 2 to a modulator 3, in which the signal is modulated on a carrier wave generated by an oscillator 4. The output current of the modulator 3 passes through a magnetisation winding 5, as a result of which an alternating field having a variable amplitude is generated in the ferromagnetic core 6 of an inductance coil 7. This alternating field controls the inductance of coil 7 and so acts upon the amplitude, the frequency or the phase of an auxiliary oscillation produced by an oscillator 8 in accordance with the nature of the arrangement. From the auxiliary oscillation thus acted upon the amplified signal is derived by means of a suitable detector 9, which signal is taken from the terminals 10 and 11. By means of a backcoupling circuit 12 at least a part of the amplified signal is joined to the signal to be amplified in such a manner as to obtain a regenerative backcoupling. This backcoupling may, with impunity, be made so strong as to bring the amplifier on the verge of self-oscillation.

The frequency of the carrier wave produced by the oscillator 4 is preferably made high with respect to the frequency of the oscillator 8, since in this case less trouble is experienced from beat tones and modulation products having the frequencies of the modulators 4 and 8.

Figure 2:
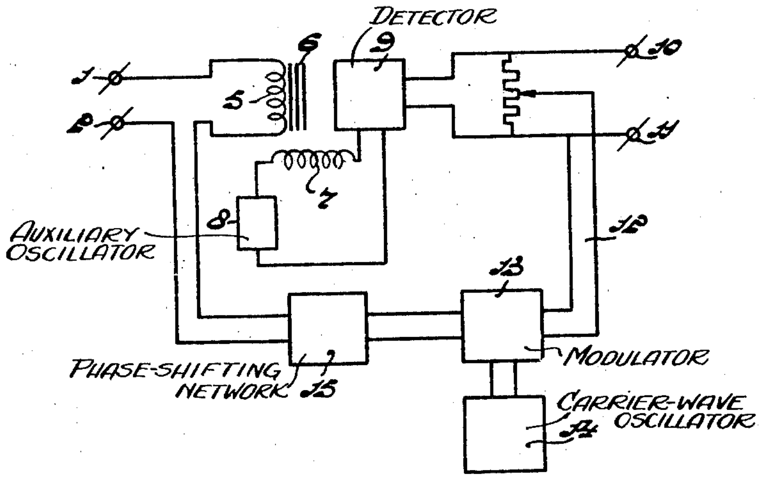

Fig. 2 represents an arrangement according to the invention, which is suitable for use in carrier-wave telephony systems for amplifying and demodulating an incoming modulated signal. In this case the signal to be amplified and demodulated is directly supplied to the magnetisation winding 5 through the terminals 1 and 2. The backcoupling circuit 12 comprises a modulator 13 and a carrier-wave oscillator 14 which is associated therewith and by means of which the amplified signal is modulated. In this case the frequency of the oscillator 14 must be equal to that of the carrier wave to which the incoming signal is modulated. The output voltage of the modulator 13 is supplied to a phase-shifting network 15, which permits adjustment of the phase required for the backcoupling, and is then joined to the incoming signal. For the rest the arrangement shown in Fig. 2 corresponds to that represented in Fig. 1.

It is not essential for the amplifier according to the invention to derive the amplified signal by detection from the auxiliary oscillation. In fact, it is also possible under certain conditions either to use the auxiliary oscillation modulated by the signal to constitute the output signal, or to derive from this auxiliary oscillation an amplified modulated signal by frequency transformation.

What I claim is:

1. Apparatus for amplifying and demodulating a carrier wave of a predetermined frequency and having a signal modulation component imposed thereon comprising an inductance having a ferromagnetic core, an input circuit magnetically coupled to said core, means to apply said modulated carrier wave to said input circuit to vary the permeability of said core accordingly, a source of auxiliary oscillations, the frequency of said carrier wave being high relative to said auxiliary oscillations, a detector, means coupling said source through said inductance to the input of said detector whereby said auxiliary oscillations are modulated as a function of the combined carrier wave and signal, an output circuit coupled to said detector to derive the amplified signal therefrom, and a coupling circuit feeding back regeneratively a portion of said amplified signal to said input circuit and including means to combine said amplified signal with an auxiliary carrier wave whose frequency corresponds to that of said carrier wave.

2. An arrangement as set forth in claim 1 further including a phase shifting network interposed between said feedback coupling circuit and said input circuit.

GERARD HEPP.

REFERENCES CITED

The following references are of record in the file of this patent:

UNITED STATES PATENTS

| Number | Name | Date |
|---|---|---|
| 1,544,381 | Elmen | June 30, 1925 |
| 2,108,642 | Boardman | Feb. 15, 1938 |
| 2,164,383 | Burton | July 4, 1939 |